United States Patent [19]
Von Bogdandy et al.

[11] 3,810,609
[45] May 14, 1974

[54] SHAFT-TYPE DIRECT-REDUCTION FURNACE

[75] Inventors: Ludwig Von Bogdandy, Oberhausen-Sterkade; Helmut Becker, Bottrop; Rudolf Grewer, Oberhausen; Heinz Dieter Pantke, Essen-Frintrop; Ulrich Pohl, Mulheim/Ruhr, all of Germany

[73] Assignee: Thyssen Niederrhein GmbH Hutten und Walzwerke, Essener Oberhausen, Germany

[22] Filed: Nov. 3, 1971

[21] Appl. No.: 195,261

[30] Foreign Application Priority Data
Nov. 3, 1970  Germany.............................. 2053950

[52] U.S. Cl...................................... 266/25, 266/29
[51] Int. Cl............................................ C21b 13/02
[58] Field of Search ............. 266/25, 29; 75/33, 34, 75/35, 36, 37

[56] References Cited
UNITED STATES PATENTS
2,591,789  4/1952  De Jahn................................. 75/34
1,928,140  9/1933  Smith..................................... 75/37
3,369,888  2/1968  Cruse..................................... 75/34

FOREIGN PATENTS OR APPLICATIONS
975,444  3/1951  France................................... 75/35

Primary Examiner—Gerald A. Dost
Attorney, Agent, or Firm—Karl F. Ross; Herbert Dubno

[57] ABSTRACT

A shaft-type direct-reduction furnace in which a descending charge in an upright furnace chamber of particulate iron oxide or like iron-oxide bodies moves countercurrent to a rising reducing-gas stream (e.g., a mixture of carbon monoxide and hydrogen) and sponge iron is discharged at the bottom of the furnace. The discharge mechanism comprises a horizontally reciprocable discharge plate underlying the mouth of the furnace such that a conical pile of sponge iron is formed thereon and the mouth of the furnace bottom remains free from gas-distributing or discharge-mechanism obstructions.

3 Claims, 4 Drawing Figures

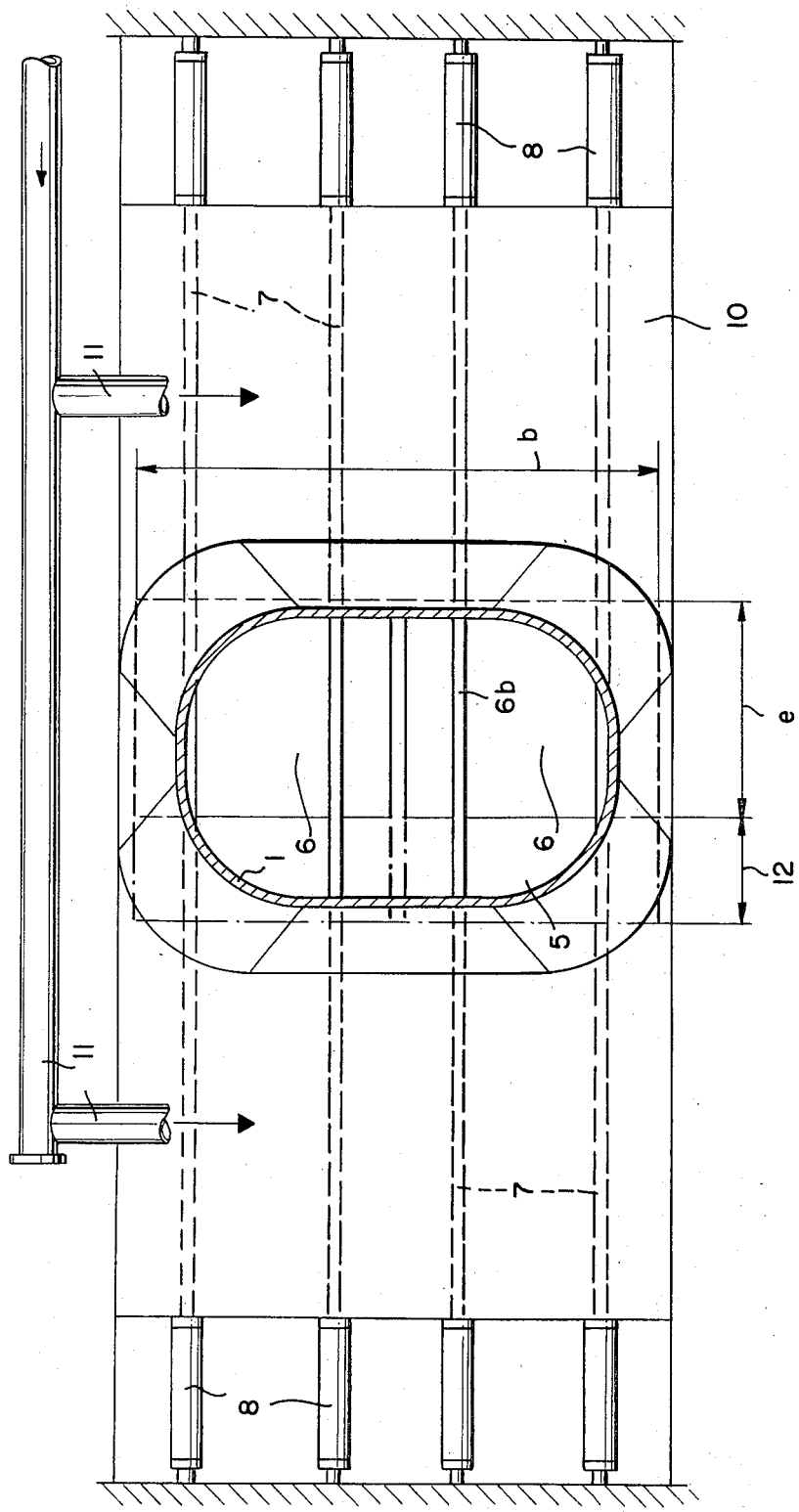

SHAFT-TYPE DIRECT-REDUCTION FURNACE

FIELD OF THE INVENTION

Our present invention relates to a shaft-type furnace for the direct reduction of a metal oxide and, more particularly, to a furnace of the type wherein a gas-permeable charge of iron oxide descends countercurrent to a rising reducing-gas stream and a sponge-iron or other solid reduction product is discharged at the base of the furnace.

BACKGROUND OF THE INVENTION

The direct reduction of metal oxides generally involves the reaction of a gas-permeable solid phase, e.g., consisting of iron-oxide particles, pellets or briquettes, with a gas phase consisting of one or more reducing gases, e.g., a mixture of carbon monoxide and hydrogen, to obtain thereby a solid product of higher elemental-metal content. In ferrous metallurgy, direct-reduction furnaces of the shaft type generally comprise a feeding device at the top of the furnace for depositing iron oxide pellets, granules or particles therein, a device at the base of the furnace for removing the metallized charge, e.g., sponge iron, and means for passing a reducing gas upwardly through the furnace countercurrent to the descending solid charge therein. The difficulties encountered with such furnaces generally arise from nonuniform distribution of the reducing gas over the furnace cross section, irregular discharge of the solid product and nonuniformity of reaction of the gas with the charge over the furnace cross section.

The problem is heightened by the fact that temperatures achieved in such furnaces are relatively high and that it is difficult on the one hand to use complicated discharging devices because they are sensitive to heat and, on the other hand, to obtain the desired uniformity of gas distribution using piston arrangements, vibrating grates and like discharge systems.

We might mention that attempts have been made to solve the problem of gas distribution by positioning upwardly convergent distribution bodies at the base of the furnace for supplying the reducing gas. This has proved to be a handicap in many cases because the furnace mouth was thereby constricted and difficulties arose in preventing the destruction of such distributing hoods or bodies at the elevated furnace temperatures.

OBJECTS OF THE INVENTION

It is the principal object of the present invention to provide an improved shaft-type direct-reduction furnace, especially for iron-oxide bodies (e.g., of iron ore or iron-ore concentrates), whereby the aforementioned disadvantages can be obviated.

Yet another object of this invention is to provide a shaft-type furnace for the purposes described which affords more efficient discharge of the metallized product and greater uniformity of gas distribution and yet is of simple construction, and free from the difficulties of cooling and the like characterizing other systems.

Yet another object of the invention is to provide an improved discharge arrangement for a furnace of the above-described type.

It is yet another object of the invention to provide an improved method of operating a direct-reduction shaft furnace, especially for the direct reduction of iron oxides to produce sponge iron.

SUMMARY OF THE INVENTION

These objects and others which will become apparent hereinafter are attained, in accordance with the present invention, by providing, in a shaft-type direct-reduction furnace for the direct reduction of iron-oxide bodies to sponge iron with reducing gases such as hydrogen and carbon monoxide mixtures, a discharge table is provided directly beneath the shaft with such spacing from the bottom of the furnace that a frustum shaped pile of the dischargeable product is maintained on the table which is movable to discharge portions of the product deposited upon this pile. It will be apparent that the furnace is free from any gas-distribution hood or any other constricting element within the furnace mouth and nevertheless is capable of obtaining the uniformity of gas distribution which has hitherto been associated with the presence of upwardly convergent bodies at the furnace mouth.

In its apparatus aspects, therefore, the apparatus comprises an upright furnace shaft receiving a descending column of a gas-permeable charge, preferably iron-oxide pellets, and having a downwardly open mouth at the bottom of the shaft, means for feeding the charge into the furnace at the top thereof, means for feeding a reducing gas, preferably a mixture of hydrogen and carbon monoxide, into the shaft through its mouth at the bottom of the furnace, and a discharge mechanism below the shaft for dispensing the charge without obstruction of the furnace mouth.

The discharge mechanism comprises a discharge table spaced directly beneath the mouth and supporting the column in the form of a frustum-shaped pile of the charge, and drive means for reciprocating the table to dislodge and carry away portions of the pile on opposite sides thereof in the direction of displacement of the table. Preferably, the table includes a substantially flat thin plate shiftable in a horizontal plane beneath the mouth and having a flat upper surface or an upper surface provided with entraining formations, e.g., ribs running transversely to the direction of displacement of the plate. Advantageously, the plate is cooled by a high-temperature fluid, e.g., steam, which is fed to the plate through traction rods or the like coupled to the drive means which may consist of an eccentric or the like or a hydraulic or pneumatic piston-and-cylinder arrangement capable of performing reciprocating movement. The table may, in turn, ride upon a flat surface forming a support and the floor of a discharge trough defining a linear horizontal transport path for the dispensed charge on opposite sides of the reciprocation plate. At the ends of this transport path, at opposite sides of the plate, the floor of the trough may be provided with discharge openings through which the charge is caused to cascade by reciprocation of the plate or table.

According to another feature of the invention, the shaft widens downwardly and is of more or less conical configuration, to define a pressure cone of the charge which is supported upon the reciprocating table, the latter having a width in the direction transverse to the direction of reciprocation which is substantially equal to that of the shaft at its mouth while the dimension of the reciprocating table in the direction of reciprocation is approximately equal to half this width and be less than the corresponding dimension of the furnace mouth.

It has also been found to be advantageous to provide the drive means such that it is capable of reciprocating the table through a maximum stroke to each side of a median position which is equal to at most one half the diameter of the support cone or the dimension of the support cone in this direction of reciprocation. A smaller fractional displacement may also be provided. Still another feature of the invention resides in enclosing the trough in a housing which may be used to supply the reducing gas to the furnace, conduit means being employed to deliver the gas to the interior of the housing. Of course, some other treating medium may equally be used.

It will be apparent, therefore, that the material is not displaced by a bar or by a striker bar or a like obstructing structure at the base of the furnace but is carried out of the furnace on the moving table. The material rests upon the table at the pressure produced by the column of charge and, as the table is shifted to one side by the reciprocating means, all of the charge below the mouth of the furnace is likewise shifted in this direction. Behind this pile of charge, additional product accumulates and, upon reciprocation of the table in the opposite direction, the leading portion of the charge of the first stroke remains in the discharge trough while the pile is shifted in the opposite direction and the process repeated. As a result, increments of the pile carried by the table or displaced alternately to one side and to the other side of the furnace mouth and the charge descends in a substantially continuous and progressive manner. The troughs fill with the charge and eventually the charge cascades through the openings at the ends of the transport path.

The charge thus moves more or less continuously through the furnace in spite of the reciprocating movement of the table with each inner portion of the charge eventually becoming the outer portion which is deposited in the respective trough. The flow of material through the shaft is thus uniform and continuous and the reaction of the rising gases therethrough is likewise uniform. Packing of the charge cannot occur inasmuch as the substantially constant pressure at the cone is maintained by a continuous feed of fresh charge to the top of the furnace. The movement of the charge is uniform through all cross-sections of the furnace and we might note that the ribs or ridges previously mentioned at the upper surface of the table need not be used in most instances. Furthermore, the plate may be relatively thin and can be cooled by running coolant channels through ribs provided in the direction of displacement of the plate. When necessary, the plate may be hollow to define a chamber through which the coolant is passed.

With respect to the shape or the shaft, we would like to emphasize that it preferably has a generally conical downwardly convergent configuration. The term "generally conical" as used herein is intended to refer to a right-circular cone, a generally pyramidal configuration with rounded corners or any other shape offering a more or less constant divergence of the walls of the furnace from the head thereof to its mouth, provided that sharp edges between the walls are not formed. We have already noted that the discharge table is approximately equal in width to that of the mouth of the shaft in a direction transverse to the direction of displacement of the table and consequently to the diameter of the right-circular cone base constituted by the furnace shaft when the latter is a true cone. In the direction of the table, its width is approximately half the width of the shaft mouth and thus approximately half this diameter. The width in the direction of displacement may, however, be equal approximately to the diameter of the pressure cone formed by the charge above the table. By limiting the stroke of the discharge table to a fraction of its width in the direction of reciprocation, it is possible to ensure that the pressure of the charge acts continuously upon the table.

DESCRIPTION OF THE DRAWING

The above and other objects, features and advantages of the present invention will become more readily apparent from the following description, reference being made to the accompanying drawing in which:

FIG. 3 is a cross-sectional view taken along the line III — III of FIG. 1; and

SPECIFIC DESCRIPTION

Figure 1:
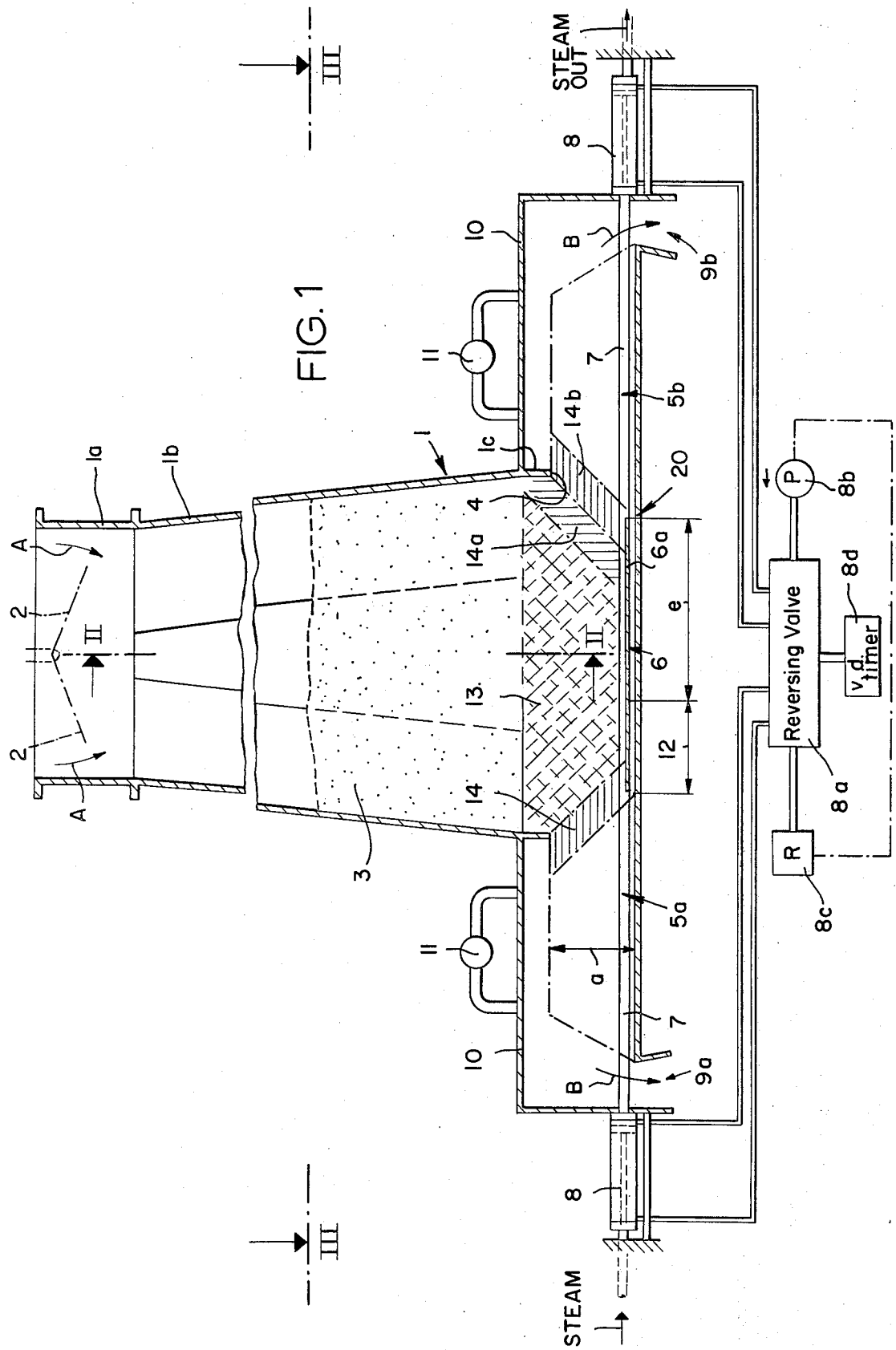
FIG. 1 is a somewhat diagrammatic vertical cross-section of a shaft furnace for the direct reduction of iron oxide pellets according to the invention.
Figure 2:
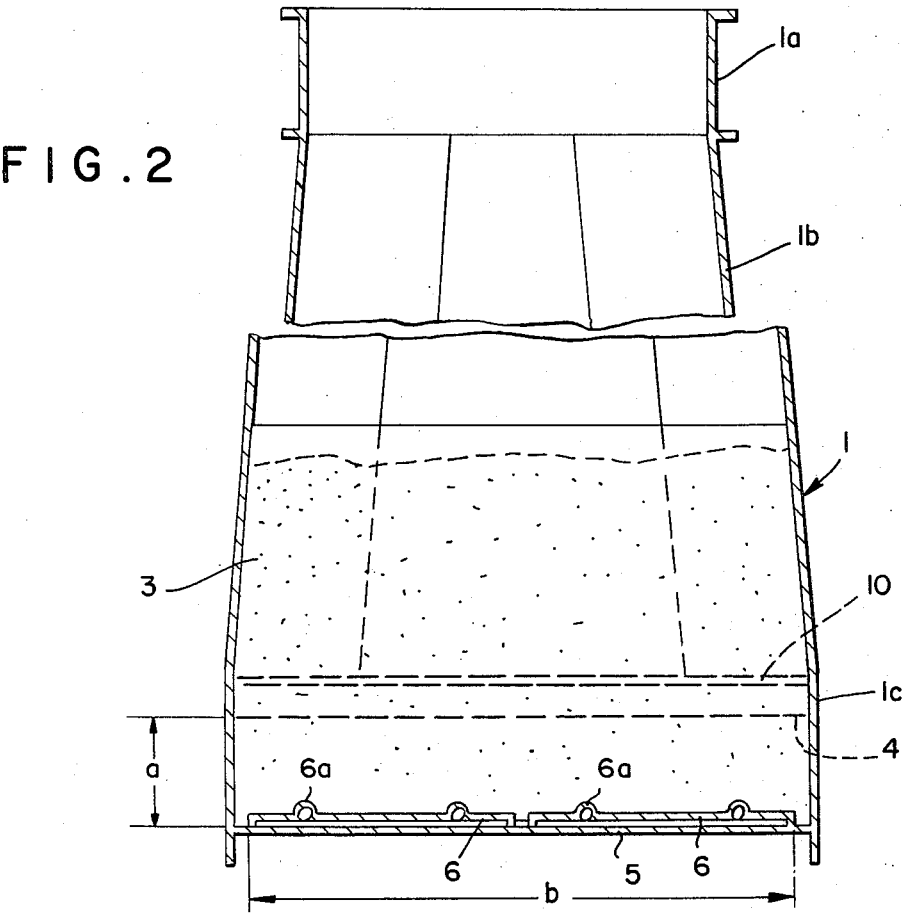
FIG. 2 is a cross-sectional view taken along the line I – I of FIG. 1.

The furnace 1 shown in FIGS. 1 – 3 comprises a vertical shaft having a cylindrical head 1a, a downwardly convergent pseudoconical body 1b and a short cylindrical base 1c defining the mouth 4 of the furnace. At the upper end of the furnace, there may be provided a charge-fed device represented by the flaps 2 which can be swung to and fro as represented by the arrows A to meter iron-oxide pellets into the furnace at a rate related to the rate of discharge of the sponge iron product so as to maintain the height of the charge 3 within the furnace substantially constant.

Directly beneath the furnace mouth 4, there is provided a discharge mechanism which comprises a stationary support floor 20 and a discharge table 6 reciprocable along this floor. The floor 20 defines a horizontal transport path 5a and 5b to opposite sides of the median position of the table 6 which eventually fill with the dispensed charge represented in dot-dash lines in FIG. 1. With the further reciprocation of the table 6, the charge is permitted to cascade (arrow B) through openings 9a and 9b on opposite sides of the transport path. The table 6 is located a distance $a$ beneath the mouth 4 of the furnace to define a charge cone or frustum 13 having a height $a$ and resting upon the table 6.

Figure 4:
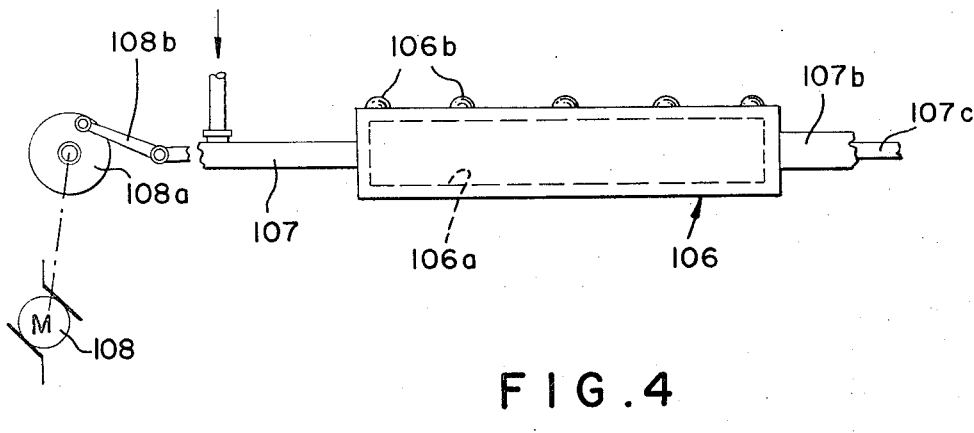
FIG. 4 is a detail view illustrating another feature of the invention.

In the embodiment of FIGS. 1 – 3, the table 6 is constituted by a relatively thin planar flat plate which rides via ribs 6a upon the floor 20. As can be seen in FIG. 4, the plate 106 may also be formed as a hollow body to the interior compartment 106a of which a coolant may be fed. This modification also shows the ribs 106b which may extend transversely to the direction of reciprocation of the table (arrow C'). Also from FIG. 4 it should be noted that the drive means may include an eccentric 108 driven by a motor 108a and coupled by a link 108b to a traction rod 107 through the interior of which the coolant is supplied to chamber 106a as represented at 107a. The opposite traction rod 107b may be provided with a discharge duct 107c for the coolant.

More generally, however, the table 6 is provided with traction bars 7 which are hollow and can serve to circulate a coolant through these bars and channels 6b formed in the plate as shown in FIGS. 2 and 3. In this embodiment, two table members 6 are provided to constitute a single table structure.

The bars 7 terminate in pistons within cylinders 8 which may be of the traction type and are hydrolytically or pneumatically operated via a reversing valve 8a, a pump 8b, a reservoir 8c and a valve-driving timer 8d in a conventional manner. The coolant is fed through each cylinder arrangement.

As is also apparent from FIG. 2, the discharge table structure 6 has a width b which approximately equals that of the mouth 4 of the shaft and a dimension e in the direction of reciprocation which is approximately equal to half the width of mouth 4. The transport paths 5a and 5b extend to opposite sides of the movement of the table as pusher troughs and have a length beyond the maximum stroke position of the table equal approximately to the width of the mouth of the furnace. The stroke of table 6 however, is relatively small, as represented at 12. The transport paths to either side of the furnace are enclosed in housing 10 and also serve to provide inlet chambers for the medium used to treat the charge. In the present case, for the direct reduction of iron oxide, a reducing gas is introduced through conduits 11 to the housing. The gas distribution within the furnace is surprisingly uniform.

In operation, the initial pile is maintained at 13 and a movement of the table 6 to the left carries the portion of the charge represented at 14 and illustrated by horizontal hatching laterally outwardly of the discharge cone. Concurrently the region 14a shown by vertical hatching fills with fresh descending charge. During the reverse movement of the table, the portion 14 remains in the trough while the charge is shifted in the opposite direction to deposit the portion 14b, the process continuing until the troughs 5a and 5b are filled and the charge passes from the openings 9a and 9b. In spite of the reciprocating movement of the table, the charge in the furnace has a substantially continuous descending motion.

We claim:

1. A shaft furnace, especially for the interaction of a reducing gas with a metallurgical charge, comprising:

an upright furnace shaft receiving a descending column of said charge, said shaft having a downwardly open mouth at the bottom thereof;
a discharge mechanism below said shaft for dispensing said charge, said mechanism comprising
a discharge table spaced directly beneath said mouth and supporting said column with said charge forming a frustum-shaped pile upon said table,
guide means forming a horizontal transport path for said table extending to either side thereof,
means forming a pair of downwardly directed openings at opposite ends of said path for the cascade therethrough of furnace charge withdrawn from said shaft below said mouth, and
drive means for horizontally reciprocating said table below said mouth along said guide means toward opposite ends of said path by a distance approximately equal to half the width of said mouth in the direction of reciprocation to dislodge and carry away portions of said pile beneath said mouth, said table having a width in said direction greater than the half-width of said mouth,
said path supporting said material on opposite sides of said table beyond the maximum stroke thereof in the respective direction and over a distance approximately equal to the width of said shaft at said mouth beyond the maximum stroke position of said table, said openings being located at the ends of said path,
means for feeding a reducing gas into said shaft through said mouth, said table including a hollow substantially flat plate; and
means for passing a coolant through the interior of said plate, said shaft widening downwardly and said table having a width corresponding substantially to that of said shaft at said mouth, said charge bearing upon said table in a pressure cone, said table being shiftable by said drive means only through a fraction of the diameter of this cone on contact with said table, said means for feeding said gas to said furnace including a housing enclosing said path and said table, and conduit means opening into said housing.

2. The furnace defined in claim 1 wherein said drive means includes an eccentric drive connected to said table for reciprocating same.

3. The furnace defined in claim 1 wherein said drive means includes a piston-and-cylinder arrangement for reciprocating said table.

* * * * *